UNITED STATES PATENT OFFICE.

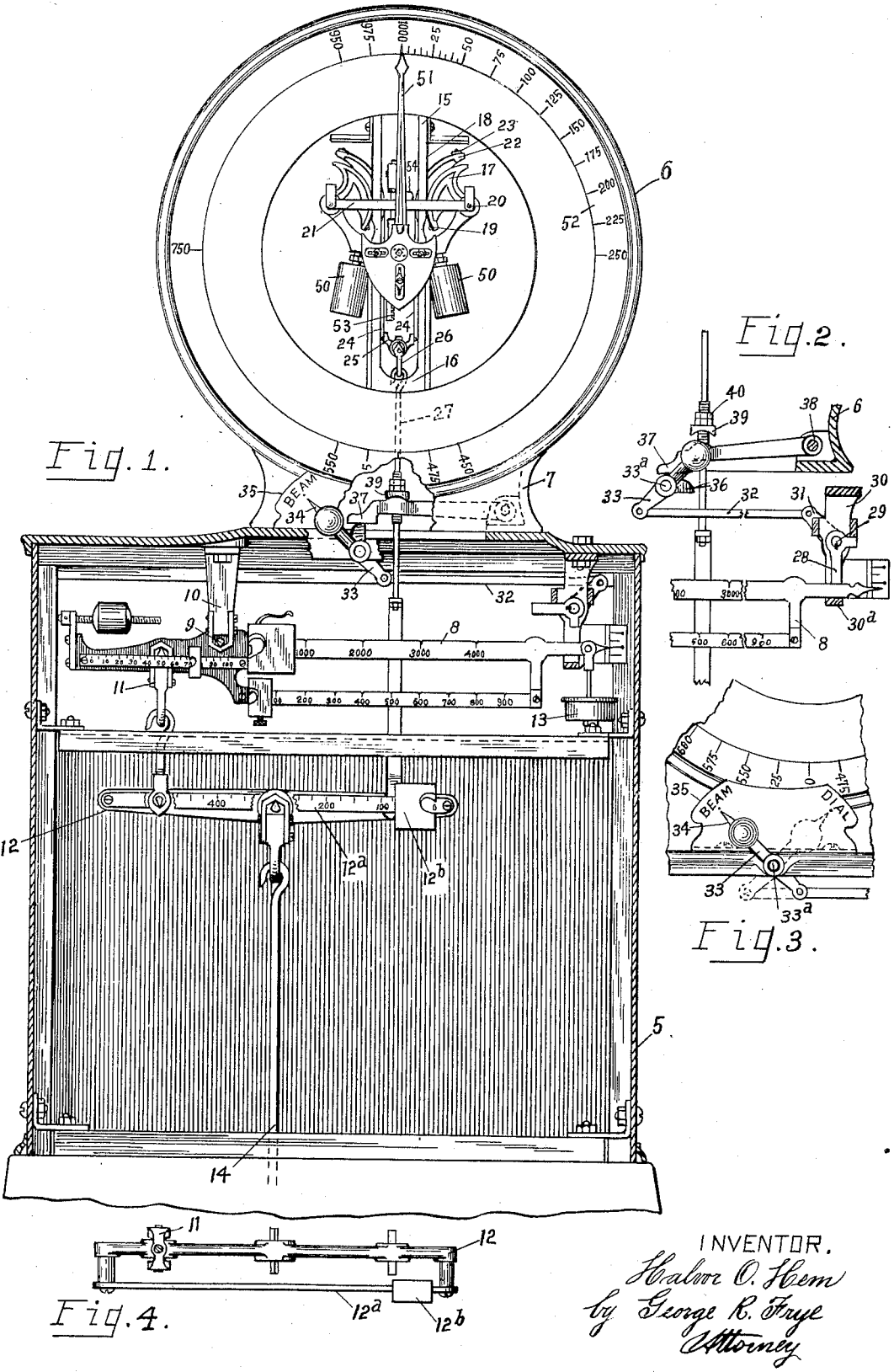

HALVOR O. HEM, OF TOLEDO, OHIO, ASSIGNOR, TO TOLEDO SCALE COMPANY, OF TOLEDO, OHIO, A CORPORATION OF NEW JERSEY.

WEIGHING-SCALE.

1,392,827.     Specification of Letters Patent.     Patented Oct. 4, 1921.

Application filed August 14, 1916. Serial No. 114,785.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates to weighing scales of the combined automatic and beam type, and is designed particularly to provide a scale of the pendulum type adapted to weigh loads within the capacity marked on the dial and to provide an additional beam mechanism capable of being used to weigh loads above the dial capacity. It has been found that in most all classes of weighing when the scale has been well chosen as to dial capacity, the large majority of weighings can be made on the pendulum counterbalance and indicated on the dial, but when the exceptional instance occurs and a load in excess of the dial capacity is to be weighed, it is desirable to have a counterbalancing means of sufficient capacity to offset the weight. In my improved scale, both the pendulum counterbalancing mechanism and the beam weighing mechanism are suitably connected to the same platform levers, and means are provided for rendering inoperative one or the other of said mechanisms to enable the independent use of the other mechanism. Also both the beam and dial mechanism may be simultaneously used and will each of them show the weight of the commodity on the platform. Thus, one mechanism may be used as a check on the other, or either mechanism may be used, as desired.

Other objects and advantages will readily appear from the following detail description, wherein a preferred embodiment of my invention is described and particularly pointed out in the subjoined claims.

Reference is to be had to the accompanying drawings illustrating a preferred embodiment of my invention, and wherein similar reference numerals designate similar parts throughout the several views.

In the drawings:—

Figure 1 is a front elevation of the upper portion of my improved scale, with portions broken away to show the interior mechanism; Fig. 2 is an enlarged detail view of the locking mechanism in the position assumed when the beam weighing mechanism is inoperative; Fig. 3 is a detail elevation of the lower portion of the dial and the lever for shifting the locking means; and Fig. 4 is a detail plan view of the shelf lever forming the connecting link between the beam and pendulum weighing mechanisms.

In the drawings, 5 designates a scale housing adapted to inclose the beam weighing mechanism, and 6 designates a casing supported by the neck 7 upon the housing 5 and adapted to inclose the pendulum weighing mechanism. The beam weighing mechanism, as herein shown, comprises a scale beam 8 fulcrumed, as at 9, upon bearings 10 supported upon the housing 5 and connected, as by means of the link 11, with one arm of the suspended shelf lever 12 which is connected at substantially its center with the platform lever mechanism through the steelyard rod 14. The scale beam 8 may carry one or more graduated beams as desired, the illustrated embodiment showing three of such beams graduated respectively to 100, 900 and 4000 lbs. The number of beams, as well as their graduations, may, of course, be changed as desired. The hanging poise 13 is constructed of sufficient weight to normally float the platform and platform levers through the shelf lever 12 and steelyard rod 14 when it is desired to use the beam weighing mechanism alone.

It is to be understood that any suitable platform and platform lever mechanism may be employed in connection with the weighing mechanisms of this scale, the weighing mechanisms herein shown being designed to satisfactorily operate when employed in various forms of scales and with different types of platform lever mechanisms.

The pendulum counterbalancing mechanism herein shown comprises a rectangular frame having four vertical pillars 15 supported from the wall of the scale housing 6 and secured together at top and bottom by cross pieces 16. The pillars 15 form guide bearings or tracks for rocker segments 17 which have rolling contact thereon, being supported in position by flexible ribbons 18 of steel or other suitable material fastened to the lower ends of the segments, as at 19, and at their upper ends to the pillars, being thus interposed between the pillars and segments in every position of the latter. The segments 17 are secured upon cross shafts 20, and the two shafts are connected together by cross bars 21, the segment shafts and cross bars forming a rectangular frame by means of which the dial indicating mechanism of the scale is actuated upon the operation of the pendulum mechanism.

Intermediate the members of each pair of supporting segments 17 is a larger segment 22 which is also fixed to the shaft 20, said segment extending at its periphery between the pillars on the same side of the rectangular frame and is connected at its upper end, as at 23, to a flexible ribbon 24 which extends over the arcuate face of the segment and is attached at its lower end to an equalizer bar 25.

The pendulum weights 50 are also connected with the shafts 20 substantially in line with the larger segments 22. An indicator hand 51 is pivoted concentrically of the indicator dial 52 and is revolved from the cross bars 21 of the rectangular frame joining the segments 17 by means of a vertically-disposed rack 53 attached by a resilient connecting member 54 to a center bar pivotally mounted in the cross bars 21 substantially centrally of the length thereof. The rack 53 is in mesh with a pinion (not shown) mounted on the journal of the indicator hand.

The construction on both sides of the weighing mechanism is substantially the same, and the ribbons 24 are attached to opposite sides of the equalizer bar 25, which is pivotally connected to a link 26, which in turn is connected with the upper end of a hook rod 27, the lower extremity of which carries a bearing supporting a pivot in the other arm of the shelf lever 12, to which the beam weighing mechanism is also connected. It will thus be apparent that the opposite arms of the shelf lever 12 are freely suspended from the pendulum weighing mechanism and the beam weighing mechanism, and said lever is connected at substantially its center portion with the steelyard rod 14.

It is to be understood that the disclosed pendulum mechanism is shown merely by way of example, and other forms of pendulum mechanism as well as equivalent automatic mechanism such as employ springs or gravity weights as the counterbalance elements may also be employed within the purview of my invention.

Means are provided whereby either the beam weighing mechanism or the pendulum weighing mechanism may be locked in inoperative position and the other of said mechanisms simultaneously freed for weighing operations. In the illustrated embodiment, I have shown an arm 28 secured on the shaft 29 journaled in a bracket 30 which may also act as the trig loop of the beam weighing mechanism, said arm 28 being adapted to be swung into engagement with the upper face of the scale beam 8 to force the same against the lower portion 30$^a$ of the bracket 30, whereby the scale beam is locked with its outer end down. Rotation of the shaft 29 is effected through the arm 31 fixed at one end to said shaft and pivotally connected at its other extremity to the link 32, the other end of which is pivoted to the lower arm of the locking lever 33. The lever 33 is pivoted intermediate its ends on a stub shaft 33$^a$ carried by the housing 5 and the upper arm thereof carries a pointer 34 adapted to coöperate with an index plate 35 to show to the operator which of the weighing mechanisms is free to perform the weighing operation. The stub shaft 33$^a$ carries an arm 36 having a curved face adapted to contact with the lower surface of the lever 37 which is pivoted, as at 38, within the casing 6. The lever 37 is preferably apertured and surrounds the hook-rod 27 connecting the pendulum weighing mechanism with the shelf lever 12. The hook-rod 27 is suitably threaded intermediate its ends and carries an abutment 39 which may be adjusted to any desired position to coöperate with the lever 37 to lock the pendulum counterbalance in inoperative position. Suitable lock nuts 40 are provided to maintain the desired adjustment of the abutment 39.

The locking mechanism for the pendulum mechanism is so connected with the locking mechanism of the beam weighing mechanism that when one weighing mechanism is locked, the other is simultaneously unlocked.

In Fig. 1 the locking lever 33 is shown in one extreme position whereby the locking mechanism for the pendulum counterbalance has been actuated to raise the hook-rod 27 through the engagement of the abutment 39 thereon with the lever 37. This raising of the hook-rod 27 relieves the pull previously exerted upon the pendulums and allows the pendulums to fall from their normally slightly elevated position to their lowermost position, and also that arm of the shelf lever 12 connected with the hook-rod 27 is slightly elevated so that when the beam weighing mechanism is operated the pivot on said shelf lever resting in the hook-rod 27 will act as the fulcrum for the shelf lever. With the pendulum counterbalance thus locked, the platform lever mechanism is counterbalanced by the weight of the hanging counterpoise 13 and connections made through the steelyard rod 14, shelf lever 12 and link 11 to the scale beam. A load on the scale platform can then be weighed in the usual manner of beam scales, and as shown in Fig. 1, the graduated beam 12$^a$ carried by the shelf lever 12 and coöperating with a sliding poise 12$^b$ can be used as a tare or capacity increasing beam.

When it is desired to weigh loads within the capacity of the pendulum counterbalance mechanism, the locking lever 13 is moved from the full line position shown in Figs. 1 and 3 to the dotted line position shown in Fig. 3, whereby the lever 37 is allowed to fall away from the abutment 39 to release the pendulum weighing mechanism, and the link 32 is thrown forward to swing the arm 31 and shaft 29 so as to bring the locking arm 28 into engagement with the upper face of the scale beam 8 and then upon further movement to force the scale beam downwardly to lock it in position against the bracket 30. This downward movement of the outer end of the scale beam to force it against the bracket 30 serves to elevate the other arm of said scale beam and the link 11 to a slight extent, whereby the pivot of the shelf lever 12 cooperating with the link 11 is slightly elevated so that it will serve as the fulcrum for the shelf lever 12 during the weighing operations of the pendulum counterbalance mechanism. In this position the platform lever mechanism is floated by means of the pendulums, which are swung slightly outward to positions offsetting the pull of the platform levers.

The indicating mechanism must be so related to the pendulums that when the platform lever mechanism is counterbalanced the indicator hand will point to zero. The scale can then be used in the usual manner of pendulum scales, and a load placed on the scale platform will exert a pull on the steelyard rod 14 that will be transmitted through the shelf lever 12 and hook-rod 27 to lower the equalizer bar 25, whereby the pendulums will be swung upwardly and outwardly a distance sufficient to offset the weight of the load. This swinging of the pendulums will serve to elevate the rack so that the indicator hand will be swung through a sufficient arc to indicate on the dial the weight of the load on the scale platform.

When both beam and dial weighing mechanism are to be simultaneously used, the pull exerted by the pendent weight 13 and the pendulums must be so related that each of them will support half of the weight necessary to float the platform lever mechanism, and when so supporting the levers will be in their zero positions. Thereupon, it is only necessary to swing the locking mechanism entirely out of engagement with either mechanism, so that both of the mechanisms will be free to move when a load is placed on the scale platform. The weight of such a load will move the steelyard 14 and shelf lever 12 downwardly and this movement will be equally transmitted to both the beam and pendulum mechanisms because of the connection of the steelyard centrally of the shelf lever and the suspension of the ends of the shelf lever from the beam and pendulum mechanisms respectively. The weight of the load can then be read on either the beam or dial, or one weighman can read the weight on one mechanism and a checker can verify it by reading the other indication. Many other uses of the double indication will readily suggest themselves to those skilled in the art.

While it will be apparent that the illustrated embodiment of my invention herein disclosed is well calculated to adequately fulfil the objects primarily stated, it is to be understood that the invention is susceptible to modification, variation and change without departing from the spirit and scope of the invention as set forth in the subjoined claims.

Having described my invention, I claim:

1. A scale having beam weighing mechanism and automatic dial indicating weighing mechanism, said beam weighing mechanism and automatic weighing mechanism being located one above the other, and means for simultaneously effecting total weighings on both of said mechanisms.

2. A scale having beam weighing mechanism and automatic dial indicating weighing mechanism, said beam weighing mechanism and automatic weighing mechanism being located one above the other, platform-supporting levers, and connections from the platform levers to both of said weighing mechanisms to effect simultaneous total weighings on both mechanisms.

3. A scale having beam weighing mechanism and automatic dial indicating weighing mechanism, said beam weighing mechanism and automatic weighing mechanism being located one above the other, platform-supporting levers, and connections from the platform levers to both of said weighing mechanisms including a shelf lever connected to the platform lever and to each of the weighing mechanisms whereby simultaneous total weighings may be effected on both of the weighing mechanisms.

4. A scale having beam weighing mechanism and automatic dial indicating weighing mechanism, said beam weighing mechanism and automatic weighing mechanism being located one above the other, a lever connected with each of said mechanisms, and platform-supporting levers connected wth the first-mentioned lever whereby simultaneous total weighings may be effected on both of the weighing mechanisms.

5. A scale having beam weighing mechanism and automatic dial indicating weighing mechanism, said beam weighing mechanism and automatic weighing mechanism being located one above the other, a lever connected adjacent its opposite ends with each of said mechanisms, and platform-supporting levers connected with the first-mentioned lever centrally of the connections to the weighing mechanisms whereby simultaneous total weighings may be effected on both of the weighing mechanisms.

6. A scale having beam weighing mechanism and automatic dial indicating weighing mechanism, said beam weighing mechanism and automatic weighing mechanism being located one above the other, a lever having one end suspended from the beam weighing mechanism and its opposite end suspended from the automatic dial indicating weighing mechanism, and platform-supporting levers connected with the first-mentioned lever centrally of the connections to the weighing mechanisms whereby simultaneous total weighings may be effected on both of the weighing mechanisms.

7. A scale having beam weighing mechanism and automatic dial indicating weighing mechanism, and means for rendering one of said mechanisms inoperative and freeing the other of said mechanisms for weighing operations including locking members arranged adjacent the respective mechanisms, and a lever connected with both members to move one of them into engagement with the adjacent mechanism when the other member is freed.

8. A scale having beam weighing mechanism and automatic dial indicating weighing mechanism, and means for locking one of said mechanisms in inoperative position and freeing the other of said mechanisms for weighing operations including locking members arranged adjacent the respective mechanisms, and a lever connected with both members to move one of them into engagement with the adjacent mechanism when the other member is freed.

9. A scale having beam weighing mechanism and automatic dial indicating weighing mechanism, and means for locking each of said mechanisms in inoperative position including a locking member arranged adjacent each of said mechanisms, and a lever connected with both members to move one of them into engagement with the adjacent mechanism when the other member is freed.

10. A scale having beam weighing mechanism and pendulum weighing mechanism, and means for rendering one of said mechanisms inoperative and freeing the other of said mechanisms for weighing operations including locking members arranged adjacent the respective mechanisms, and a lever connected with both members to move one of them into engagement with the adjacent mechanism when the other members is freed.

11. A scale having beam weighing mechanism and pendulum weighing mechanism, and means for locking one of said mechanisms in inoperative position and freeing the other of said mechanisms for weighing operations including locking members arranged adjacent the respective mechanisms, and a lever connected with both members to move one of them into engagement with the adjacent mechanism when the other member is freed.

12. A scale having beam weighing mechanism and pendulum weighing mechanism, and means for locking each of said mechanisms in inoperative position including a locking member arranged adjacent each of said mechanisms, and a lever connected with both members to move one of them into engagement with the adjacent mechanism when the other members is freed.

13. In a scale having beam weighing mechanism and pendulum weighing mechanism, means for locking each of said mechanisms in inoperative position, said means including a locking lever arranged adjacent each of said mechanisms, and operating means common to both said levers arranged to move one of them into engagement with the adjacent mechanism when the other is freed for weighing operation.

14. A scale having beam weighing mechanism and pendulum weighing mechanism, locking means adapted to be moved into contact with the beam to hold the beam in inoperative position, and means for locking the pendulum weighing mechanism in inoperative position, said two locking means being connected for simultaneous movement whereby one of said mechanisms is rendered inoperative and the other of said mechanisms is freed for weighing operations.

15. A scale having beam weighing mechanism and pendulum weighing mechanism, means for locking the mechanism in inoperative position, including a lever adapted to be moved into engagement with a portion of the weighing mechanism, and means for locking the beam in inoperative position, said locking means being connected for simultaneous movement whereby one of said mechanisms is rendered inoperative and the other of said mechanisms is freed for weighing operations.

16. A scale having beam weighing mechanism and pendulum weighing mechanism, a lever connected with each of said mechanisms whereby either of said mechanisms may be used independently of the other, and means for locking either of said mechanisms in inoperative position.

17. A scale having beam weighing mechanism and pendulum weighing mechanism, said beam and pendulum weighing mechanisms being located one above the other, and a lever connected adjacent its opposite ends with each of said mechanisms whereby either of said mechanisms may be used independently of the other.

18. A scale having beam weighing mechanism and pendulum weighing mechanism, a lever connected adjacent its opposite ends with both of said mechanisms whereby either of said mechanisms may be used independently of the other, and means for locking either of said mechanisms in inoperative position.

19. A scale having beam weighing mechanism and pendulum weighing mechanism, a lever connected with each of said mechanisms whereby either of said mechanisms may be used independently of the other, and a tare beam mounted on said lever adapted to be used with either weighing mechanism.

20. A scale having a lever connected intermediate its ends with the platform mechanism, a scale beam pivotally connected with said lever adjacent one end, a pendulum weighing mechanism pivotally connected with said lever adjacent its opposite end, and means for locking either the scale beam or the pendulum weighing mechanism in inoperative position and freeing the other for weighing operations.

21. In a scale beam weighing mechanism, and a pendulum weighing mechanism, a lever having pivots arranged therein adjacent its opposite ends adapted to be connected with the respective weighing mechanisms, and means for raising the pivot at either end of the lever so that said pivot will act as a fulcrum for the lever in the weighing operations.

HALVOR O. HEM.

Witnesses:
F. A. CROWLEY,
FRANCES S. DOYLE.